US012768717B2

(12) United States Patent
Chang et al.

(10) Patent No.: US 12,768,717 B2
(45) Date of Patent: Oct. 20, 2026

(54) INFRARED LIGHT SENSING DEVICE

(71) Applicant: Taiwan-Asia Semiconductor Corporation, Hsinchu City (TW)

(72) Inventors: Yen-Hsiang Chang, Taichung (TW); Sheng-Wei Chen, Hsinchu City (TW); Tzu-Hui Lin, Taoyuan (TW)

(73) Assignee: TAIWAN-ASIA SEMICONDUCTOR CORPORATION, Hsinchu City (TW)

( * ) Notice: Subject to any disclaimer, the term of this patent is extended or adjusted under 35 U.S.C. 154(b) by 175 days.

(21) Appl. No.: 18/532,673

(22) Filed: Dec. 7, 2023

(65) Prior Publication Data

US 2024/0219233 A1 Jul. 4, 2024

(30) Foreign Application Priority Data

Dec. 29, 2022 (TW) ................................ 111150769

(51) Int. Cl.
*G01J 3/10* (2006.01)
*G01J 3/02* (2006.01)

(52) U.S. Cl.
CPC ............. *G01J 3/108* (2013.01); *G01J 3/0262* (2013.01); *G01J 3/0291* (2013.01)

(58) Field of Classification Search
CPC ......... G01J 3/0262; G01J 3/0291; G01J 3/108
See application file for complete search history.

(56) References Cited

U.S. PATENT DOCUMENTS 5,274,352 A * 12/1993 Nishikawa ............. H01C 1/034 338/307
5,670,999 A * 9/1997 Takeuchi ............. B41J 2/14233 347/70
11,320,310 B2 * 5/2022 Siess ......................... G01J 3/36
2011/0057129 A1 3/2011 Yao et al.
2012/0050841 A1 * 3/2012 Okano .................... G02F 1/353 359/326
2013/0327931 A1 * 12/2013 Hsu ....................... H10F 77/334 250/237 R
2014/0084134 A1 * 3/2014 Chen ..................... G06F 3/0304 359/511

(Continued)

FOREIGN PATENT DOCUMENTS

KR 20190108527 A * 9/2019 ................ G01J 1/42
TW 201133777 A 10/2011

*Primary Examiner* — Hina F Ayub
(74) *Attorney, Agent, or Firm* — MUNCY, GEISSLER, OLDS & LOWE, P.C.

(57) ABSTRACT

An infrared light sensing device includes a substrate, a light source module, a light sensing module, a barrier structure and a protective cover. The light source module, the light sensing module and the barrier structure are arranged on the substrate, and the barrier structure is used to isolate the light source module and the light sensing module. The protective cover is bonded to the barrier structure and includes a plate, a first bandpass optical film and a second bandpass optical film. The first bandpass optical film is disposed on the plate and faces the light source module, and the first bandpass optical film corresponds to a first infrared light spectrum range. The second bandpass optical film is disposed on the plate and faces the light sensing module, the second bandpass optical film corresponds to a second infrared light spectrum range located within the first infrared light spectrum range.

12 Claims, 3 Drawing Sheets

(56) References Cited

U.S. PATENT DOCUMENTS

| | | | | |
|---|---|---|---|---|
| 2014/0091211 | A1* | 4/2014 | Kitahara | G01J 3/26 359/578 |
| 2015/0212618 | A1 | 7/2015 | Lan | |
| 2016/0120450 | A1* | 5/2016 | Sakurai | A61B 5/14552 600/310 |
| 2016/0238439 | A1* | 8/2016 | Chu | G01J 1/0459 |
| 2018/0129328 | A1 | 5/2018 | Park et al. | |
| 2020/0290384 | A1* | 9/2020 | Date | B41J 2/2146 |
| 2024/0102861 | A1* | 3/2024 | Tisserand | G01J 3/0262 |
| 2024/0175823 | A1* | 5/2024 | Tani | G01B 11/165 |

* cited by examiner

INFRARED LIGHT SENSING DEVICE

CROSS-REFERENCES TO RELATED APPLICATIONS

This application claims priority to Taiwan Patent Application No. 111150769 filed on Dec. 29, 2022, which is hereby incorporated by reference in its entirety.

BACKGROUND OF THE INVENTION

Field of the Invention

The present invention relates to an infrared ray sensing device, and more particularly, to an infrared light sensing device using different bandpass optical films for the light emitting side and the light receiving side.

Descriptions of the Related Art

Liquid optically clear adhesive is used in the packaging process of conventional infrared light sensing devices to bond the protective cover to the light source module and the light sensing module. As shown in FIG. 1, after the light source module 310 and the light sensing module 320 of the conventional infrared light sensing device 300 are encapsulated with the packaging material 330, the liquid optically clear adhesive 350 is first filled between the packaging material 330 and the structural wall 340. Then, the protective cover 360 is bonded to the sensing element through the liquid optically clear adhesive 350, thereby completing the packaging of the conventional infrared light sensing device 300. Since the aforementioned approach of using the liquid optically clear adhesive 350 to bond the protective cover 360 is technically complicated, and the cost of using the liquid optically clear adhesive 350 is relatively high, it is not favorable to manufacture the conventional infrared light sensing device 300.

Furthermore, in the conventional infrared light sensing device 300, the bandpass optical film 370 is formed on the side of the protective cover 360 which is opposite to the side bonded to the liquid optically clear adhesive 350, and then the antifouling film 380 is formed on the bandpass optical film 370. However, the aforementioned optical coatings, such as the bandpass optical film 370 and the antifouling film 380, must frequently come into direct contact with the object to be measured in use, which tends to cause the aforementioned optical coatings to peel off, resulting in inaccurate sensing. In addition, the uniform bandpass optical film 370 formed on the protective cover 360 can only be applied to a single type of light source and object to be measured, which limits its application.

Therefore, it is worthwhile to study how to design an infrared light sensing device that can solve the above problems to expand its application fields and reduce manufacturing costs.

SUMMARY OF THE INVENTION

The objective of the present invention is to provide an infrared light sensing device using different bandpass optical films for the light emitting side and the light receiving side.

To achieve the above objective, the infrared light sensing device of the present invention includes a substrate, a light source module, at least one light sensing module, a barrier structure and a protective cover. The light source module, the at least one light sensing module and the barrier structure are arranged on the substrate, and the barrier structure is used to isolate the light source module and the at least one light sensing module. The protective cover is bonded to the barrier structure and includes a plate, a first bandpass optical film and a second bandpass optical film. The plate includes a first surface and a second surface opposite to the first surface. The first bandpass optical film is disposed on the first surface and faces the light source module, and the first bandpass optical film corresponds to a first infrared light spectrum range. The second bandpass optical film is disposed on the first surface and faces the at least one light sensing module. The second bandpass optical film corresponds to at least one second infrared light spectrum range, and each second infrared light spectrum range is located within the first infrared light spectrum range.

In an embodiment of the present invention, the first infrared light spectrum range is a wide infrared light spectrum range, and each second infrared light spectrum range is a narrow infrared light spectrum range.

In an embodiment of the present invention, when the wavelength of light emitted by the light source module is 1200 nm, the second infrared light spectrum range of the second bandpass optical film can be between 1100 nm and 1300 nm.

In an embodiment of the present invention, the first infrared light spectrum range is between 800 nm and 1600 nm.

In an embodiment of the present invention, when at least one second infrared light spectrum range includes a plurality of second infrared light spectrum ranges, the at least one light sensing module includes a plurality of light sensing modules corresponding to the second infrared light spectrum ranges.

In an embodiment of the present invention, the second bandpass optical film includes a plurality of infrared light receiving regions, and each infrared light receiving region corresponds to an independent second infrared light spectrum range.

In an embodiment of the present invention, the protective cover is bonded to the barrier structure with an adhesive.

In an embodiment of the present invention, the protective cover further includes an antifouling film, and the antifouling film is disposed on the second surface.

In an embodiment of the present invention, the light source module further includes a light emitting element and a first packaging material. The first packaging material is used to encapsulate the light emitting element, and a first air layer is formed between the first packaging material and the first bandpass optical film.

In an embodiment of the present invention, the light sensing module further includes at least one light sensing element and a second packaging material, the second packaging material is used to encapsulate the at least one light sensing element, and a second air layer is formed between the second packaging material and the second bandpass optical film.

In an embodiment of the present invention, the second bandpass optical film includes a plurality of layered structures, and the layered structures comprise at least one metal alloy material layer.

In an embodiment of the present invention, each metal alloy material layer is made of a silver-platinum alloy material.

In an embodiment of the present invention, the light emitting spectrum range corresponding to the light source module is between 800 nm and 1600 nm.

Accordingly, the infrared light sensing device of the present invention uses bandpass optical films corresponding to different infrared light spectrum ranges and being respectively arranged on the light emitting side and the light receiving side to sense light in a specific single or multiple infrared light spectra. It improves application flexibility, and the design in which the bandpass optical film is formed on the side of the protective cover facing the light source module and light sensing module can also solve the problem of the bandpass optical film being easily peeled off. In addition, compared with the conventional infrared light sensing device, the design of the protective cover and the barrier structure of the infrared light sensing device of the present invention can effectively simplify the complexity of the packaging process, thereby reducing the manufacturing cost.

DETAILED DESCRIPTION OF THE PREFERRED EMBODIMENT

Since the various aspects and embodiments are merely illustrative and not restrictive, after reading this specification, there may also be other aspects and embodiments without departing from the scope of the present invention to a person having ordinary skill in the art. The features and advantages of these embodiments and the scope of the patent application will be better appreciated from the following detailed description.

Herein, "a" or "an" is used to describe one or more devices and components described herein. Such a descriptive term is merely for the convenience of illustration and to provide a general sense of the scope of the present invention. Therefore, unless expressly stated otherwise, the term "a" or "an" is to be understood to include one or at least one, and the singular form also includes the plural form.

Herein, the terms "first" or "second" and similar ordinal numbers are mainly used to distinguish or refer to the same or similar devices or structures, and do not necessarily imply the spatial or temporal order of such devices or structures. It should be understood that in certain situations or configurations, ordinal numbers may be used interchangeably without affecting the practice of the present invention.

As used herein, the term "comprise" "include," "have" or any other similar term is not intended to exclude additional, unrecited elements. For example, a device or structure comprising/including/having a plurality of elements is not limited to the elements listed herein but may comprise/include/have other elements not explicitly listed but generally inherent to the device or structure.

Figure 1:
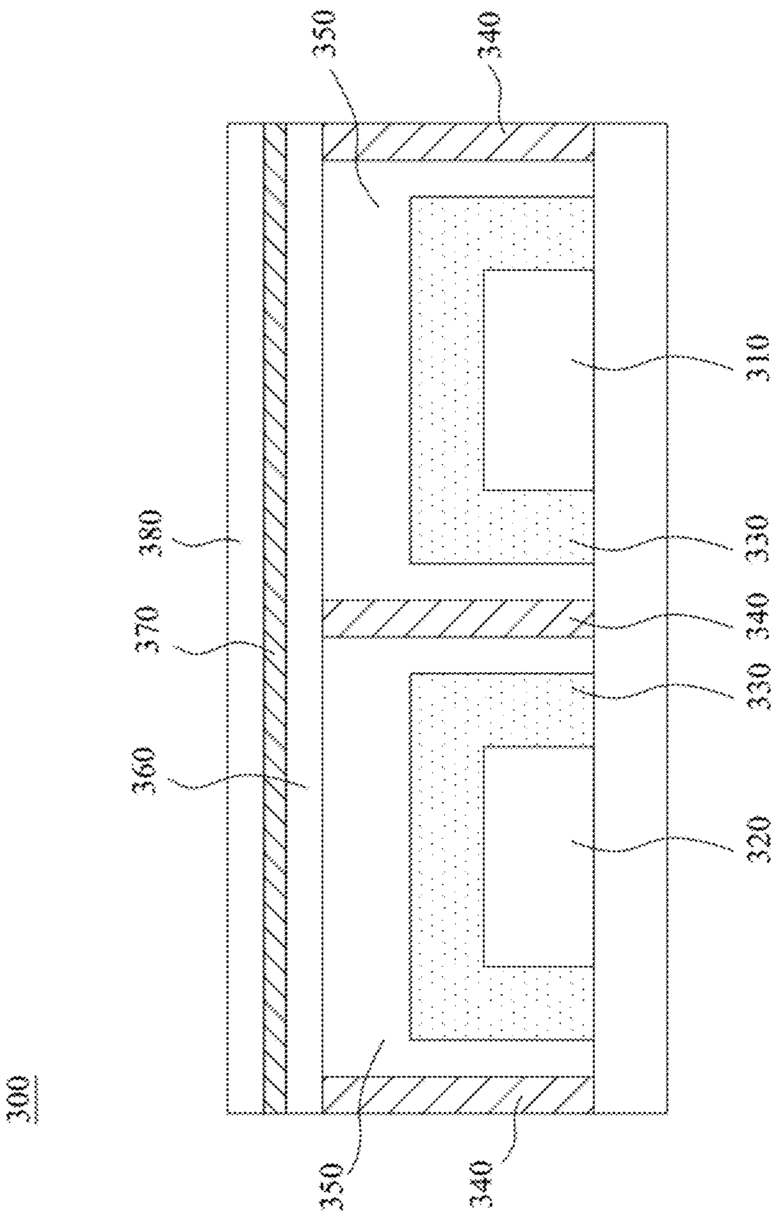
FIG. 1 (Prior art)
FIG. 1 is a schematic view of a conventional infrared light sensing device.
Figure 2:
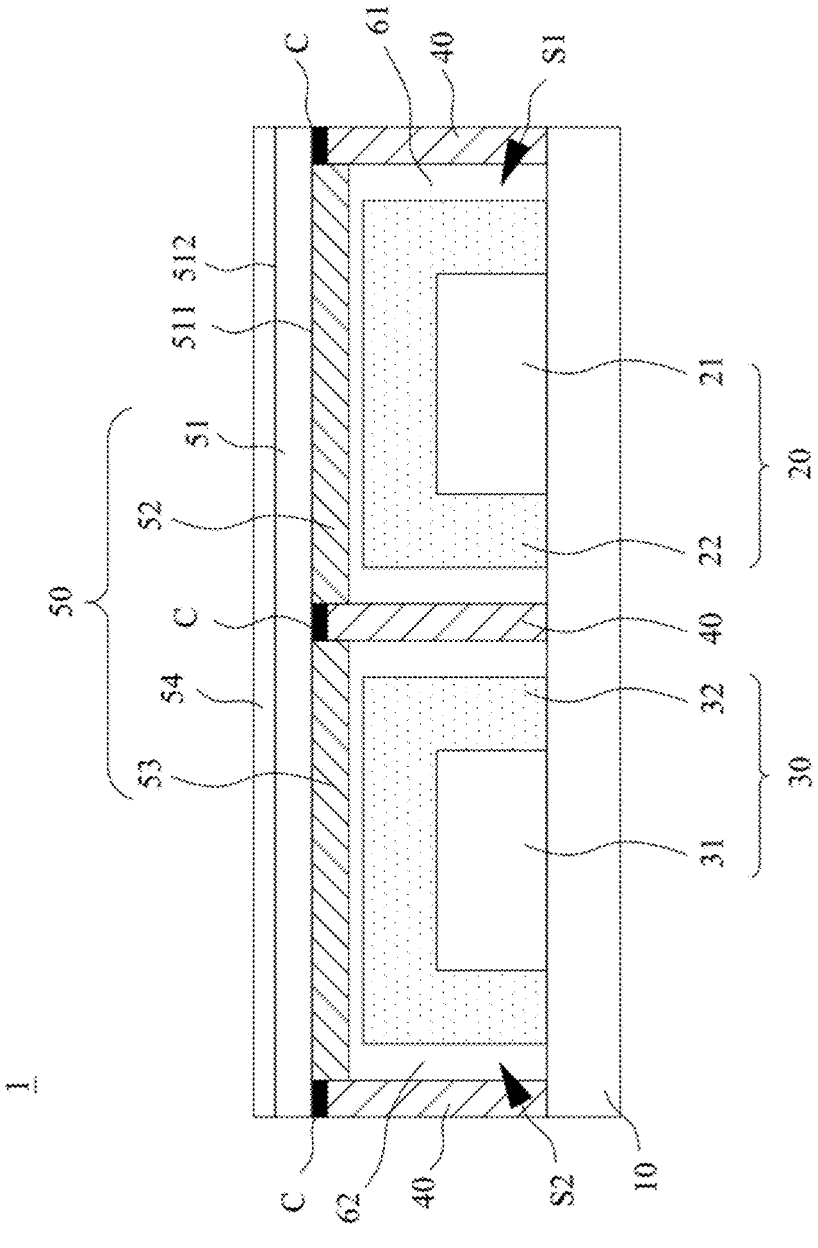
FIG. 2 is a schematic view of the first embodiment of the infrared light sensing device of the present invention.

Now, please refer to FIG. 2, which is a schematic view of the first embodiment of the infrared light sensing device of the present invention. As shown in FIG. 2, the infrared light sensing device 1 of the present invention includes a substrate 10, a light source module 20, a light sensing module 30, a barrier structure 40 and a protective cover 50. The substrate 10 mainly serves as a basic structure of the infrared light sensing device 1, and the substrate 10 can be used to support the light source module 20, the light sensing module 30, the barrier structure 40, and the protective cover 50 to form an integrated device. The substrate 10 may be made of a fiberglass (FR4) circuit board, a ceramic substrate, a glass substrate, a plastic material substrate, or a substrate made of other materials, but the present invention is not limited thereto.

The light source module 20 is disposed on the substrate 10, and the light source module 20 may be electrically connected to the circuit on the substrate 10 through wirings. The light source module 20 may include a light emitting element 21 (e.g., an LED element) and a first packaging material 22. The light emitting element 21 is used to emit light to illuminate the object to be measured, e.g., skin. The first packaging material 22 is used to encapsulate the light emitting element 21 and associated wirings. The first packaging material 22 may be silicon dioxide or other materials with light-transmissive properties. In an embodiment of the present invention, the light emitting spectrum range corresponding to the light emitting element 21 of the light source module 20 is between 800 nm and 1600 nm, but the wavelength of the light emitted by the light emitting element 21 is not limited in practice.

The light sensing module 30 is disposed on the substrate 10, and the light sensing module 30 may be electrically connected to the circuit on the substrate 10 through wirings. The light sensing module 30 may include at least one light sensing element 31 (e.g., a photo detector) and a second packaging material 32. Each light sensing element 31 is used to receive light that is diffusely reflected and then returned from the object to be measured. The configuration of the number and location of at least one light sensing element 31 may be varied here according to different design requirements. For example, in this embodiment, the light sensing module 30 includes only a single light sensing element 31, but the present invention is not limited thereto. The second packaging material 32 is used to encapsulate each light sensing element 31 and associated wirings. The aforementioned second packaging material 32 may be silicon dioxide or other materials with light-transmissive properties.

The barrier structure 40 is disposed on the substrate 10. The barrier structure 40 is mainly made of a non-transparent material to form stronger structural walls so that the barrier structure 40 is used to isolate the light source module 20 and the light sensing module 30. In the present invention, a first accommodating space S1 and a second accommodating space S2 with openings can be respectively formed by the barrier structure 40, in which the light source module 20 is located in the first accommodating space S1 to form a light emitting side, and the light sensing module 30 is located in the second accommodating space S2 to form the light receiving side. Accordingly, the barrier structure 40 can prevent the influence between the light emitting of the light source module 20 and the light receiving of the light sensing module 30.

The protective cover 50 is bonded to the barrier structure 40. The protective cover 50 includes a plate 51, a first bandpass optical film 52 and a second bandpass optical film 53. The plate 51 is made of a transparent material, e.g., a glass. The plate 51 includes a first surface 511 and a second surface 512 opposite to the first surface 511. In the present invention, the protective cover 50 is bonded to the barrier structure 40 by adhesive. For example, the structural walls have adhesive C (shown as the black region in FIG. 2), such as liquid adhesive, foam adhesive, or double sides adhesive, at one end facing the first surface 511 of the plate 51 so that when the plate 51 is disposed on the structural walls, it is bonded to the barrier structure 40 one another by the aforementioned adhesive. The plate 51 will completely cover the openings of the first accommodating space S1 and the second accommodating space S2 to form the first accommodating space S1 and the second accommodating space S2 as independent enclosed spaces, respectively.

The first bandpass optical film 52 is disposed on the first surface 511 of the plate 51, and the first bandpass optical film 52 is disposed in the position facing the light source module 20. In other words, the first bandpass optical film 52 is disposed in the position corresponding to the light emitting side. The size of the first bandpass optical film 52 is not larger than the opening of the first accommodating space S1 so that when the protective cover 50 is bonded to the barrier structure 40, the first bandpass optical film 52 is completely located in the first accommodating space S1, but the present invention is not limited thereto. In the structural design, a first air layer 61 is formed between the first packaging material 22 of the light source module 20 and the first bandpass optical film 52 to serve as a light transmission medium, thereby reducing the use of the liquid optically clear adhesive as compared to the conventional design.

The first bandpass optical film 52 corresponds to the first infrared light spectrum range. The first infrared light spectrum range is a wide infrared light spectrum range. For example, in an embodiment of the present invention, the first infrared light spectrum range is between 800 nm and 1600 nm, but the first infrared light spectrum range may also be changed according to different designs. In order to form the aforementioned first infrared light spectrum range, the first bandpass optical film 52 may include a plurality of layered structures, and the layered structures include at least one in the following group: a silicon dioxide material layer, a titanium dioxide material layer, a tantalum pentoxide material layer and a niobium pentoxide material layer.

The second bandpass optical film 53 is disposed on the first surface 511 of the plate 51, and the second bandpass optical film 53 is disposed in the position facing the light sensing module 30. In other words, the second bandpass optical film 53 is disposed in the position corresponding to the light receiving side. The size of the second bandpass optical film 53 is not larger than the opening of the second accommodating space S2 so that when the protective cover 50 is bonded to the barrier structure 40, the second bandpass optical film 53 is completely located in the second accommodating space S2, but the present invention is not limited thereto. In the structural design, a second air layer 62 is formed between the second packaging material 32 of the light sensing module 30 and the second bandpass optical film 53 to serve as a light transmission medium, thereby reducing the use of the liquid optically clear adhesive as compared to the conventional design.

The second bandpass optical film 53 corresponds to at least one second infrared light spectrum range. Each second infrared light spectrum range is a narrow infrared light spectrum range, and each second infrared light spectrum range is located within the first infrared light spectrum range. For example, when the first infrared light spectrum range is between 800 nm and 1600 nm, each second infrared light spectrum range can be any local spectrum range between 800 nm and 1600 nm (e.g., when the wavelength of light emitted by the light source module 20 is 1065 nm, it can correspond to the design of the second infrared light spectrum range of 1000 nm to 1200 nm; when the wavelength of light emitted by the light source module 20 is 1200 nm, it can correspond to the design of the second infrared light spectrum range of 1100 nm to 1500 nm; when the wavelength of light emitted by the light source module 20 is 1450 nm, it can correspond to the design of the second infrared light spectrum range of 1400 nm to 1600 nm). However, each second infrared light spectrum range may also vary depending on the design. In this embodiment, when the wavelength of light emitted by the light source module 20 is 1200 nm, the second bandpass optical film 53 can only correspond to a single second infrared light spectrum range, such as between 1100 nm and 1300 nm, but the present invention is not limited thereto. In order to form the aforementioned second infrared light spectrum range, the second bandpass optical film 53 may include a plurality of layered structures, and the layered structures include at least one metal alloy material layer, e.g., a silver-platinum alloy material layer. In addition, the second bandpass optical film 53 further includes at least one in the following group: a silicon dioxide material layer, a titanium dioxide material layer, a tantalum pentoxide material layer and a niobium pentoxide material layer.

In an embodiment of the present invention, the protective cover 50 further includes an antifouling film 54. The antifouling film 54 is disposed on the second surface 512 of the plate 51, i.e., the surface facing the object to be measured. The antifouling film 54 is used to prevent dirt or fingerprints from adhering to the second surface 512 of the plate 51. Since the antifouling film 54 is a structural design commonly used in the protective cover of conventional infrared light sensing devices, it will not be further described in detail here.

In practical operation, the infrared light sensing device 1 in the first embodiment of the present invention first emits light by the light emitting element 21 of the light source module 20, and the light will pass through the first packaging material 22, the first air layer 61, the first bandpass optical film 52, the plate 51 and the antifouling film 54 in sequence to reach the object to be measured. Since the first bandpass optical film 52 corresponds to the first infrared light spectrum range, only light corresponding to the first infrared light spectrum range can pass through the first bandpass optical film 52.

Thereafter, after being diffusely reflected by the object to be measured, the aforementioned light can pass through the antifouling film 54, the plate 51, the second bandpass optical film 53, the second air layer 62 and the second packaging material 32 in sequence, and is finally received by the light sensing element 31 of the light sensing module 30. Since the second bandpass optical film 53 corresponds to the second infrared light spectrum range, only the light corresponding to the second infrared light spectrum range can pass through the second bandpass optical film 53 and then reach the light sensing element 31. Accordingly, the infrared light sensing device 1 of the present invention uses bandpass optical films corresponding to different spectrum ranges to be respectively disposed on the light emitting side and the light receiving side so that the detectable spectrum range of light can be varied according to the design requirements for sensing a specific substance by means of different spectral designs.

Furthermore, since the first bandpass optical film 52 and the second bandpass optical film 53 of the infrared light sensing device 1 of the present invention are disposed on the side of the protective cover 50 facing the light source module 20 and the light sensing module 30, the possibility of peeling off the first bandpass optical film 52 and the second bandpass optical film 53 can be reduced. In addition, the protective cover 50 and the barrier structure 40 of the infrared light sensing device 1 of the present invention are directly bonded together with an adhesive, which can effectively reduce the bonding cost and simplify the related manufacturing process.

Figure 3:
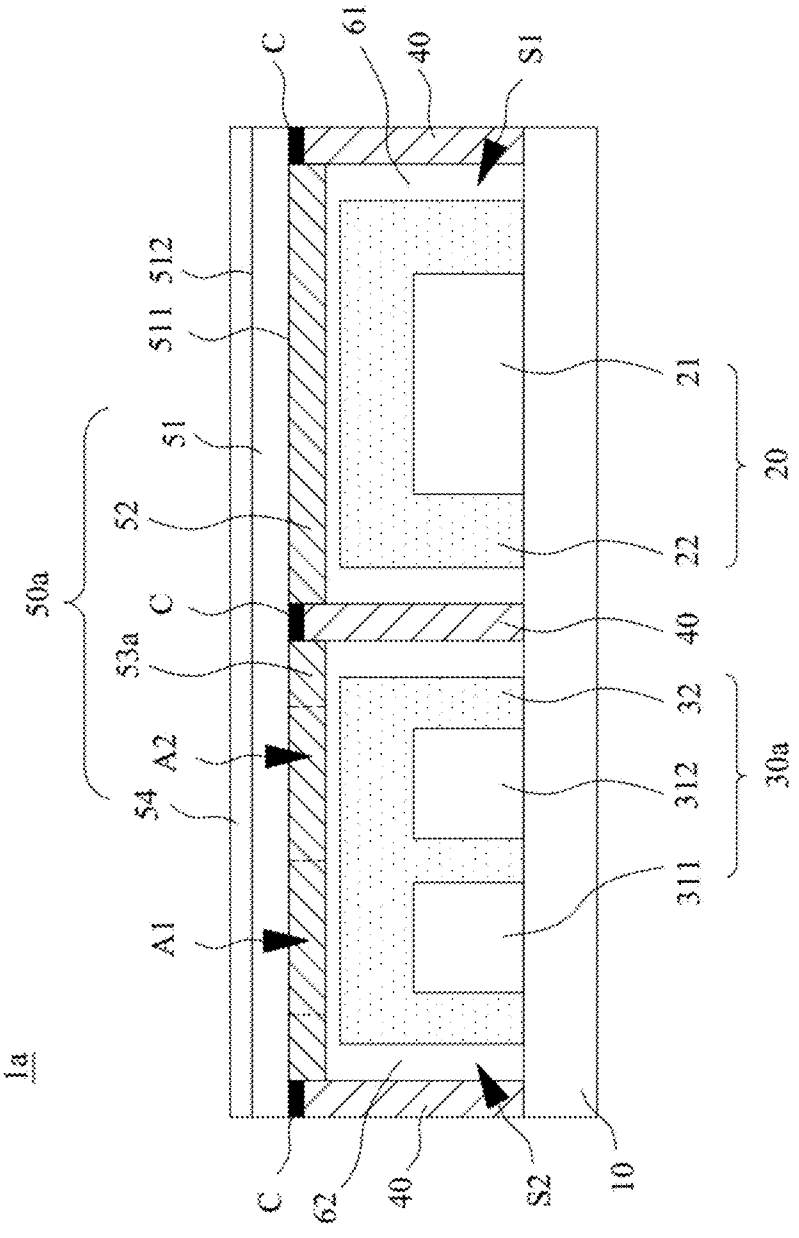
FIG. 3 is a schematic view of the second embodiment of the infrared light sensing device of the present invention.

Please refer to FIG. 3, which is a schematic view of the second embodiment of the infrared light sensing device of the present invention. This embodiment is a variation of the aforementioned first embodiment, which mainly changes the number of light sensing elements and the second infrared light spectrum range corresponding to the second bandpass optical film. As shown in FIG. 3, the light sensing module 30*a* of the infrared light sensing device 1*a* of the present invention includes two light sensing elements 311 and 312, and the light sensing elements 311 and 312 can correspondingly sense light within different infrared light spectrum ranges. In addition, the second bandpass optical film 52*a* of the protective cover 50*a* of the infrared light sensing device 1*a* of the present invention includes a plurality of infrared light receiving regions A1 and A2 (regions bounded by the dotted lines in FIG. 3), and each of the infrared light receiving regions A1 and A2 correspond to an independent second infrared light spectrum range. For example, in this embodiment, the infrared light receiving region A1 corresponds to the second infrared light spectrum range between 1100 nm and 1300 nm, and the infrared light receiving region A2 corresponds to between 1400 nm and 1600 nm. Accordingly, the light passing through the infrared light receiving region A1 of the second bandpass optical film 52*a* can be designed to be received by the light sensing element 311, and the light passing through the infrared light receiving region A2 of the second bandpass optical film 52*a* can be designed to be received by the light sensing element 312. In this way, the infrared light sensing device 1*a* of the present invention can be suitable for sensing light in more than two infrared light spectrum ranges, and the same device can be used to sense different specific substances.

The foregoing detailed description is illustrative in nature only and is not intended to limit the embodiments of the claimed subject matters or the applications or uses of such embodiments. Furthermore, while at least one exemplary embodiment has been presented in the foregoing detailed description, it should be appreciated that a wide variety of modifications to the present invention are possible. It should also be appreciated that the embodiments described herein are not intended to limit the scope, use, or configuration of the claimed subject matters in any way. Instead, the foregoing detailed description is intended to provide a person having ordinary skill in the art with a convenient guide for implementing one or more of the described embodiments. Moreover, various modifications may be made in the function and arrangement of the devices without departing from the scope defined by the claims, including known equivalents and any equivalents that may be anticipated at the time of filing this patent application.

What is claimed is:

1. An infrared light sensing device, comprising:
- a substrate;
- a light source module disposed on the substrate;
- a light sensing module disposed on the substrate;
- a barrier structure disposed on the substrate to isolate the light source module and the light sensing module and forming a first accommodating space and a second accommodating space with openings, wherein the light source module is located in the first accommodating space, and the light sensing module is located in the second accommodating space; and
- a protective cover bonded to the barrier structure with an adhesive, the protective cover comprising:
  - a plate having a first surface and a second surface opposite to the first surface;
  - a first bandpass optical film disposed on the first surface and facing the light source module, the first bandpass optical film corresponding to a first infrared light spectrum range, wherein a size of the first bandpass optical film is not larger than the opening of the first accommodating space so that when the protective cover is bonded to the barrier structure, the first bandpass optical film is completely located in the first accommodating space; and
  - a second bandpass optical film disposed on the first surface and facing the light sensing module, the second bandpass optical film corresponding to at least one second infrared light spectrum range, and each of the at least one second infrared light spectrum range being located within the first infrared light spectrum range, wherein a size of the second bandpass optical film is not larger than the opening of the second accommodating space so that when the protective cover is bonded to the barrier structure, the second bandpass optical film is completely located in the second accommodating space.

2. The infrared light sensing device of claim 1, wherein the first infrared light spectrum range is a wide infrared light spectrum range, and each of the at least one second infrared light spectrum range is a narrow infrared light spectrum range.

3. The infrared light sensing device of claim 1, wherein the first infrared light spectrum range is between 800 nm and 1600 nm.

4. The infrared light sensing device of claim 1, wherein when the at least one second infrared light spectrum range comprises a plurality of second infrared light spectrum ranges, the light sensing module comprises a plurality of light sensing elements corresponding to the second infrared light spectrum ranges.

5. The infrared light sensing device of claim 4, wherein the second bandpass optical film comprises a plurality of infrared light receiving regions, and each of the infrared light receiving regions corresponds to an independent second infrared light spectrum range.

6. The infrared light sensing device of claim 1, wherein the protective cover further comprises an antifouling film, and the antifouling film is disposed on the second surface.

7. The infrared light sensing device of claim 1, wherein the light source module further comprises a light emitting element and a first packaging material, the first packaging material is used to encapsulate the light emitting element, and a first air layer is formed between the first packaging material and the first bandpass optical film.

8. The infrared light sensing device of claim 7, wherein the light sensing module further comprises at least one light sensing element and a second packaging material, the second packaging material is used to encapsulate the at least one light sensing element, and a second air layer is formed between the second packaging material and the second bandpass optical film.

9. The infrared light sensing device of claim 1, wherein the second bandpass optical film comprises a plurality of layered structures, and the layered structures comprise at least one metal alloy material layer.

10. The infrared light sensing device of claim 9, wherein each of the at least one metal alloy material layer is made of a silver-platinum alloy material.

11. The infrared light sensing device of claim 9, wherein the layered structures further comprise at least one in the following group: a silicon dioxide material layer, a titanium dioxide material layer, a tantalum pentoxide material layer and a niobium pentoxide material layer.

12. The infrared light sensing device of claim 1, wherein a light emitting spectrum range corresponding to the light source module is between 800 nm and 1600 nm.

* * * * *